United States Patent [19]
Lenkens

[11] Patent Number: 5,673,965
[45] Date of Patent: Oct. 7, 1997

[54] TILT-SLIDING ROOF, AND VEHICLE COMPRISING SUCH A TILT-SLIDING ROOF

[75] Inventor: Petrus Christiaan Martinus Lenkens, Beugen, Netherlands

[73] Assignee: Inalfa Industries B.V., Netherlands

[21] Appl. No.: 675,215

[22] Filed: Jul. 3, 1996

[30] Foreign Application Priority Data

Jul. 20, 1995 [NL] Netherlands ............................ 1000852

[51] Int. Cl.$^6$ ........................................................ B60J 7/05
[52] U.S. Cl. ............................ 296/214; 296/221; 296/223
[58] Field of Search ................................. 296/214, 221, 296/223, 216

[56] References Cited

U.S. PATENT DOCUMENTS 5,558,394 9/1996 Mori et al. ............................ 296/223 X

FOREIGN PATENT DOCUMENTS

| 0185993 | 7/1986 | European Pat. Off. . |
| 3839578 A1 | 5/1990 | Germany . |
| 4330599 C1 | 2/1995 | Germany . |

*Primary Examiner*—Dennis H. Pedder
*Attorney, Agent, or Firm*—Westman, Champlin & Kelly, P.A.

[57] ABSTRACT

A tilt-sliding roof for a vehicle comprises a panel displaceable between a first position, in which a panel closes an opening provided in the fixed roof of the vehicle, and a second position, in which the panel opens the opening provided in the fixed roof of the vehicle at least for the greater part. The panel is further tiltable between the first closed position and a third position in which the panel is tilted at least partially from a vehicle. The tilt-sliding roof further comprises a screen which is displaceable between the first closed position and an open position, and a displacement mechanism with which, in operation, the screen is opened at least a predetermined distance if the panel is moved by this displacement mechanism into the third tilted position. The displacement mechanism includes a displaceable element, a first gear rack coupled to this displaceable element, a second gear rack coupled to the screen and a gear wheel cooperating with the first and second gear racks. The second gear rack comprises a first cam protruding towards the screen and is adapted to be engaged with a second cam protruding from the screen with which, in operation, the screen is opened at least said predetermined distance when the panel is moved to the third position.

8 Claims, 4 Drawing Sheets

5,673,965

TILT-SLIDING ROOF, AND VEHICLE COMPRISING SUCH A TILT-SLIDING ROOF

BACKGROUND OF THE INVENTION

1. Field of the Invention

The invention relates to a tilt-sliding roof for a vehicle, said tilt-sliding roof comprising a panel displaceable between a first position, in which a panel closes an opening provided in the fixed roof of the vehicle, and a second position, in which the panel opens the opening provided in the fixed roof of the vehicle at least for the greater part, said panel being further tiltable between the first closed position and a third position in which the panel is tilted at least partially out of the vehicle, said tilt-sliding roof further comprising a screen which is displaceable between the first closed position and an open position, and a displacement mechanism with which, in operation, the screen is opened at least a predetermined distance if the panel is moved by this displacement mechanism into the third tilted position, said displacement mechanism including a displaceable element, a first gear rack coupled to this displaceable element, a second gear rack coupled to the screen and a gear wheel cooperating with the first and second gear racks.

The invention further relates to a vehicle comprising such a tilt-sliding roof.

2. Description of the Related Art

In such a tilt-sliding roof, which is known from European Patent EP-B1-0 185 993, the displacement mechanism is displaced by means of a pull and push cable, wherein the displacement mechanism moves the panel from the first position to the second or third position and vice versa. The displacement mechanism includes a first gear rack which engages the gear wheel when the panel is displaced from the first closed position to the third tilted position, said gear wheel also being in engagement with a second gear rack fixed on the screen, as a result of which the displacement of the displacement mechanism for tilting the panel causes a simultaneous opening of the screen a predetermined distance. This opening for a predetermined distance is necessary to obtain a proper venting within the vehicle. Due to the engagement of the gear racks with the gear wheel it is not possible to close the screen without also closing the panel. Consequently, the screen is always open when the panel is tilted.

Opening the screen a distance which is greater than the predetermined distance is only possible with a special relatively expensive configuration of the gear wheel. When the panel is moved from the first position to the second position, the screen is displaced the same distance. For this purpose the panel includes cams engaging cams on the screen.

SUMMARY OF THE INVENTION

The object of the invention is to provide a sliding roof in which the screen is moved a predetermined distance in a simple manner when the panel is moved from a first position to the second position, in which the screen can also be moved a greater distance than the predetermined distance in a simple manner.

To obtain this object, the tilt-sliding roof according to the invention is characterized in that the second gear rack comprises a first member protruding towards the screen and adapted to be engaged with a second member protruding from the screen with which, in operation, the screen is opened at least said predetermined distance when the panel is moved to the third position.

To move the panel from the first position to the second position, the displaceable element is displaced as a result of which the panel is displaced in the desired manner thereby also displacing the first gear rack. The first member protruding from the second gear rack is coupled with the second member projecting from the screen so that both members abut. Due to the displacement of the second gear rack, the screen is thus opened said predetermined distance. Said first member determines the minimum distance through which the screen is opened. If desired, the screen may be opened a greater distance by hand, in which case the second member no longer abuts to the first member. When the panel is moved back from the second position to the first position, the first member is moved away from the second member. If desired, the screen may then be closed manually.

An embodiment of the tilt-sliding roof according to the invention is characterized in that the gear racks and the gear wheel are commonly displaceable relative to the fixed roof and the panel is moved to the second position.

As a result it is for instance possible to move the panel and screen simultaneously in the same direction if the panel is moved from the first position to the second position.

A further embodiment of the tilt-sliding roof according to the invention is characterized in that the displaceable element has a free stroke of displacement relative to the first gear rack.

Due to this feature the displaceable element can be displaced a certain distance, a so-called free stroke, during which the displacement mechanism and possibly the panel do move, whereas the first gear rack and consequently the screen are not displaced. In this manner it is for example possible to start the displacement of the panel from the first to the second position with a small downward displacement relative to the screen so as to obtain a desired relative position in which a further displacement of the displaceable element results in a sliding movement of the panel and the screen, for example simultaneously below the fixed roof.

The invention will hereafter be further explained with reference to the drawing showing an embodiment of the tilt-sliding roof according to the invention.

BRIEF DESCRIPTION OF THE DRAWINGS

FIGS. 4a–4e show different positions of a displacement mechanism of FIG. 3 in schematic plan view.

In the various Figures like parts are indicated with like reference numerals.

DESCRIPTION OF THE PREFERRED EMBODIMENTS

Figure 1:
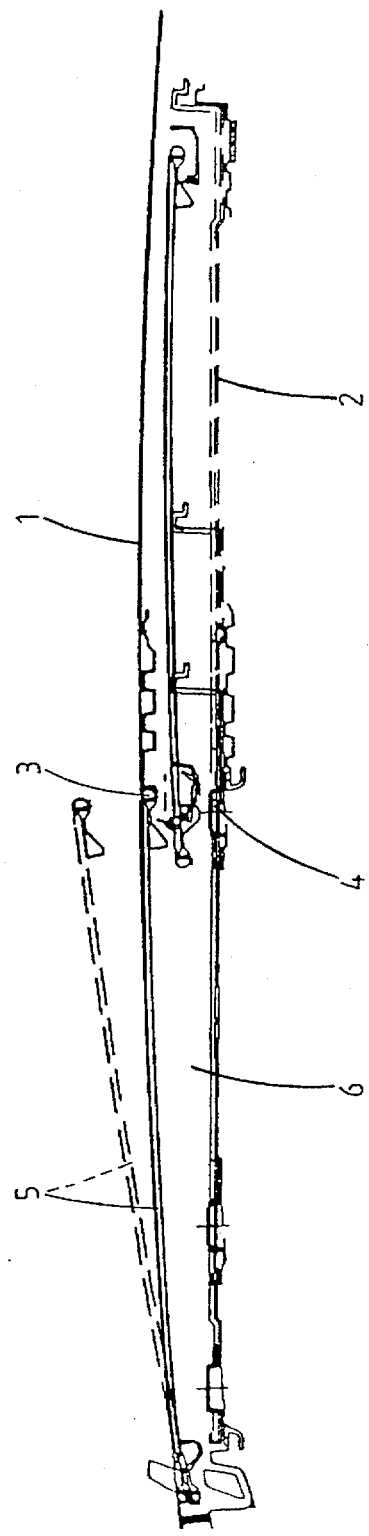
FIG. 1 is a very schematic longitudinal sectional view of a vehicle roof showing a panel and sunshade of a tilt-sliding roof for illustrating the movements thereof.
Figure 2:
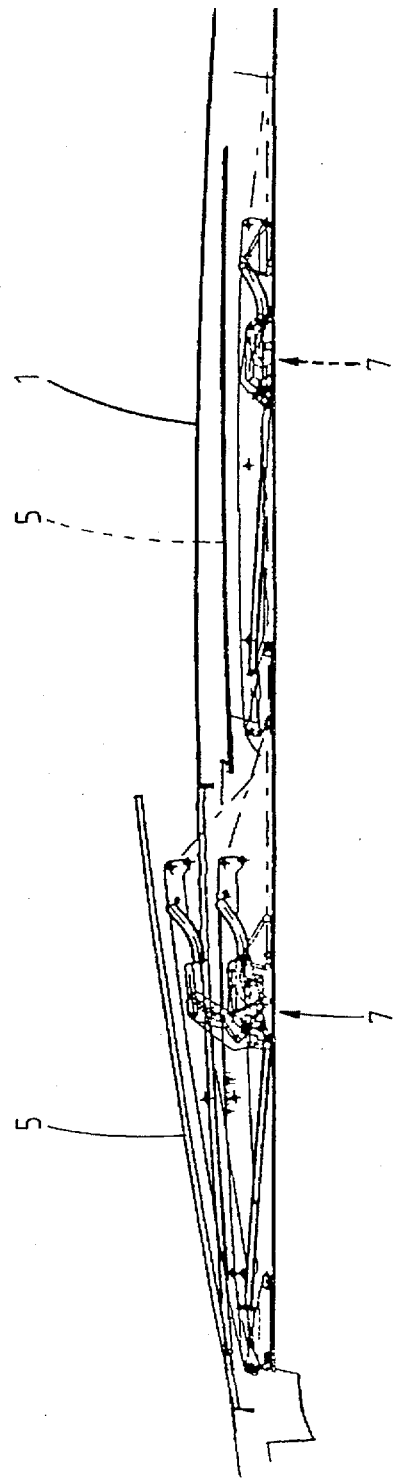
FIG. 2 is a very schematic longitudinal sectional view of a vehicle roof showing the panel and a displacement mechanism thereof to illustrate the movements thereof.

FIGS. 1 and 2 show a fixed roof 1 of a motorized vehicle, such as a passenger car, in which a frame 2 of a tilt-sliding roof is mounted to the lower side of the fixed roof. In the fixed roof 1 of the vehicle is made an opening 3, the frame 2 includes a passage opening 4 positioned below the opening 3 in the fixed roof 1 when the frame 2 is in its mounted position. The tilt-sliding roof comprises a transparent or opaque rigid panel 5, and it is also provided with an underlying screen 6 which serves as a sunshade and insulating screen in case of a transparent panel 5. In order to displace the panel 5 and the screen 6 there is provided a displacement mechanism 7 indicated schematically in FIG. 2. The portion of the displacement mechanism 7 for moving the panel 5 does not form part of the present invention and may for example be constructed in accordance with that of European Patent Application 0 662 399 which is incorporated herein by reference thereto.

By means of the displacement mechanism 7 the panel 5 is movable from a closed position, in which it closes the opening 3 in the fixed roof, on the one hand slightly downwardly tiltable and backwardly slidable to an open position in which the panel 5 opens the opening 3 for the greater part, and on the other hand tiltable to an upwardly inclined venting position with its rear edge raised (indicated in FIG. 1 by dashed lines). The screen 6 is slidable between a front position in which it closes the passage 4 in the frame 2 and a backwardly slid position in which it opens the passage 4 for the greater part.

According to the invention the part of the displacement mechanism 7 for sliding the screen 6 is constructed such that when the panel 5 is displaced to the venting position, the screen 6 is always opened a predetermined distance (if the screen 6 was not already opened manually), in order to open a part of the passage 4 on the front side of the screen 6 and thereby effecting the desired ventilation. When the panel 5 is slid backwardly the screen 6 is also carried along by the displacement mechanism 7. It is always possible to further open the screen 6 backwardly by hand if it is not yet fully displaced backwardly by the displacement mechanism 7.

Figure 3:
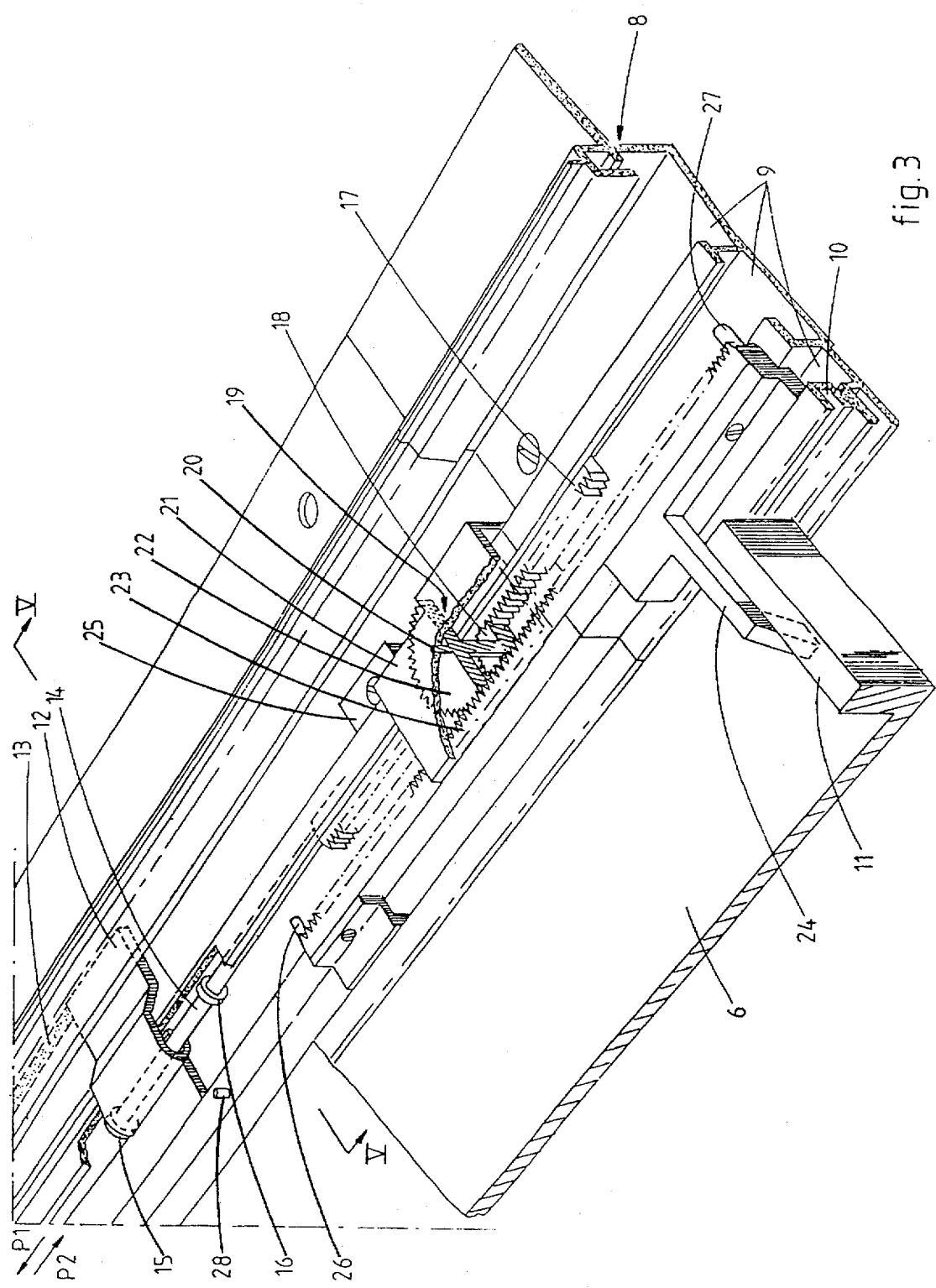
FIG. 3 is a perspective view of a portion of the displacement mechanism for the sunshade of the tilt-sliding roof according to FIGS. 1 and 2 on a larger scale.

FIG. 3 shows the elements of the displacement mechanism 7 on one side of the passage 4 in the frame 2 that is intended to displace the screen 6. On the opposite side of the passage 4 there may be arranged a similar displacement mechanism 7 constructed as mirror image. There is shown a section part serving as guide 8, said section part may form part of the frame 2 or may be attached as a separate part to the frame. It is even conceivable that the guide 8 is attached directly to the fixed roof 1 without the interposition of a frame. The guide 8 includes slots 9 extending parallel to the longitudinal direction of the vehicle roof 1 and defined by flanges for guiding parts therein. It is further shown in FIG. 3 that the screen 6 has its side edges slidably arranged in inwardly directed grooves 10 of the guide 8 and near the rear side of the screen (as seen relative to the driving direction of the vehicle indicated by the arrow P1) there is provided an upwardly projecting edge 11.

The displacement mechanism 7 comprises a displaceable element 12 which is connected to a pull and push cable 13 of the drive on the one hand and engages around a bar 14 within the guide 8 on the other hand. The rod 14 comprises two limit stops 15 and 16 between which the displaceable element 12 is displaceable in directions indicated by the arrows P1 and P2. The rod 14 has its end facing away from the displaceable element 12 attached to a first gear rack 12 guided within the slot 9 of the guide 8 and being in engagement with a first pinion 18 of a gear wheel 19 which is journaled with a vertical shaft 20 in a gear housing 21. The gear wheel 19 further comprises a second pinion 22 which is concentrically with the first pinion 18 and has a greater diameter, for example two times greater. The second pinion 22 is in engagement with a second gear rack 23 extending parallel to the first gear rack 17 and being positioned on the other side of the gear wheel 19. The second gear rack 23 comprises on the side of the screen 6 a pin 24 projecting transversely to the gear rack 23 towards the screen 6 and adapted to engage the upward edge 11. The gear housing 21 with the gear wheel 19 is guided in the slots 9 of the guide 8 in a freely slidable manner, wherein the forward displacement thereof is limited by a stop 25 mounted on the guide 8. Furthermore, the movement of the gear housing 21 relative to the second gear rack 23 is limited by end stops 26 and 27 formed on the ends of the second gear rack 23. In forward direction, that is in the direction of closing of the screen 6, the displacement of the gear rack 23 is limited by a stop 28 fixed to the guide 8.

The operation of the displacement mechanism 7 for the screen 6 will now be explained with reference to FIG. 4a–e.

Figure 4A:
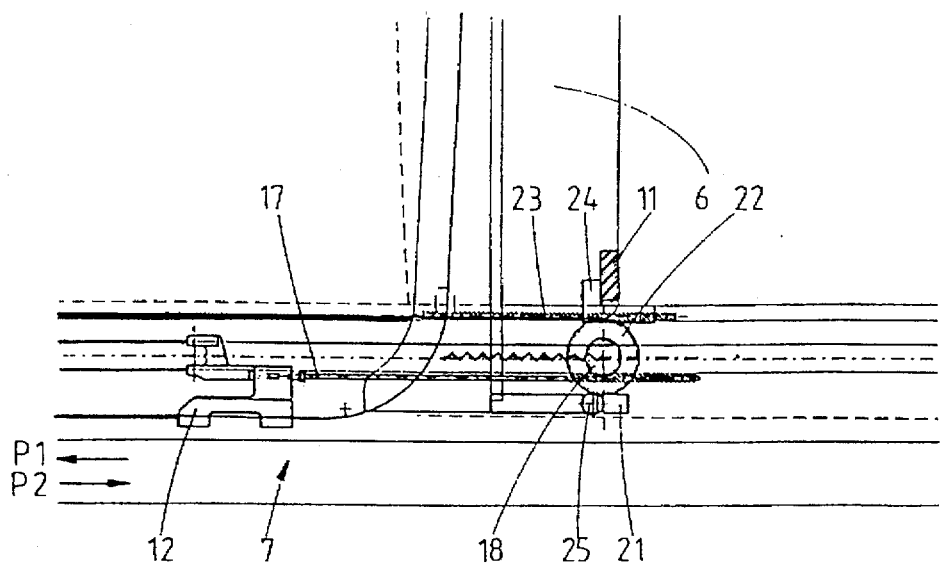
Figure 4B:
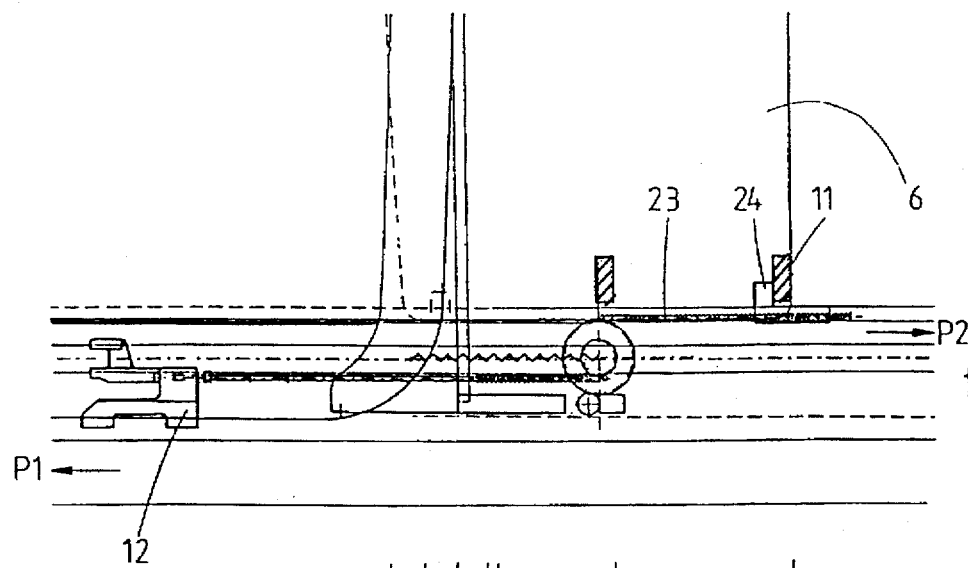

In FIG. 4a the displacement mechanism 7 is shown in the position in which both the panel 5 and the screen 6 are in the closed position. The gear housing 21 is then in the front position against the stop 25, and also the second gear rack 23 is in the front position. The pin 24 on the second gear rack 23 substantially engages the upward edge 11 on the screen 6. If the panel 5 is now to be tilted from the closed position upwardly to the venting position, then the displaceable element 12 is displaced forwardly in the direction of arrow P1 by means of the pull and push cable 13 until it abuts the front limit stop 15 of the rod 14. Upon further displacement of the displaceable element 12 in the direction of arrow P1, the first gear rack 17 is also displaced in that direction through the rod 14, thereby rotating the gear wheel 19 to the left and displacing the second gear rack 23 in the direction indicated by arrow P2, since the gear housing 21 remains stationary as a result of the stop 25. Due to the abutment of the pin 24 against the upward edge 11, also the screen 6 is displaced in the direction of the arrow P2 thereby opening the passage 4 on the front side of the screen 6. The diameter of the second pinion 22 is twice that of the first pinion 18, so that a rotation of the gear wheel 19 will displace the second gear rack 23 a distance two times that of the first gear rack 17 but in opposite direction. The screen 6 may also be displaced manually in a direction indicated by arrow P2, that is to a more open position. The manual displacement of the screen 6 in the direction indicated by arrow P1 is only possible to the position in which the upward edge 11 of the screen 6 abuts the pin 24 acting as stop.

Figure 4C:
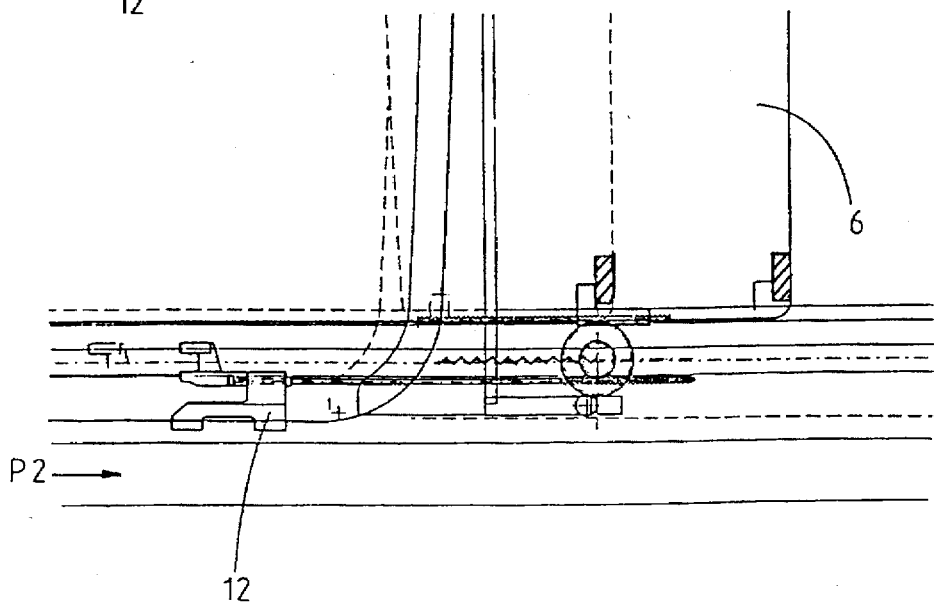
Figure 5:
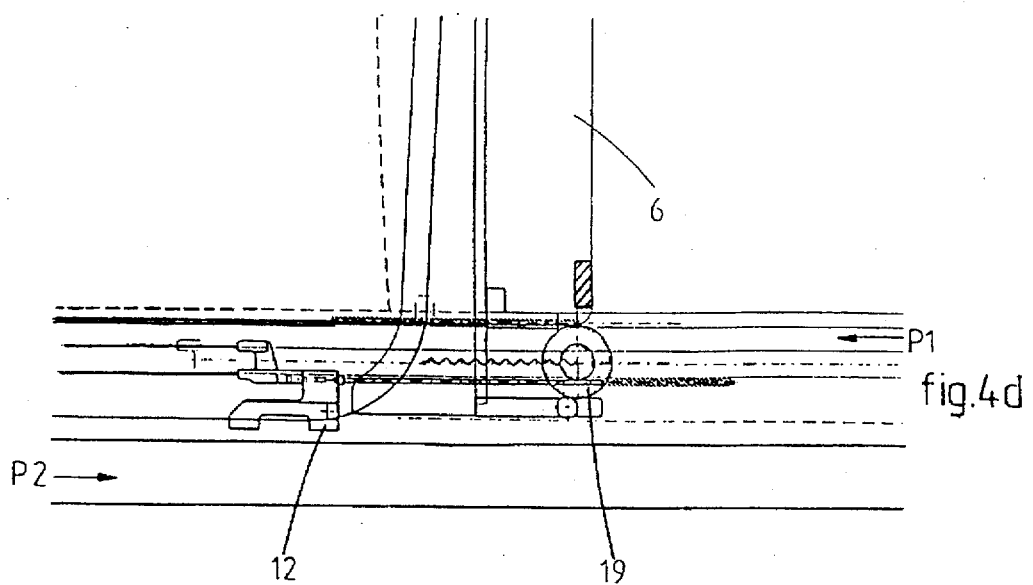
FIG. 5 is a sectional view along the line V—V in FIG. 3.
Figure 5:
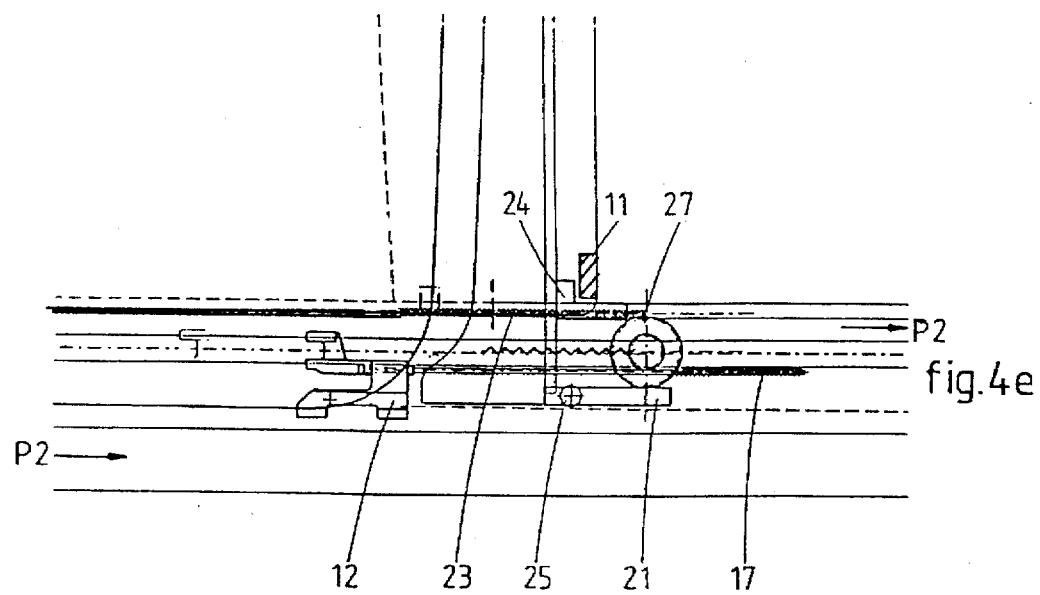
Figure 5:
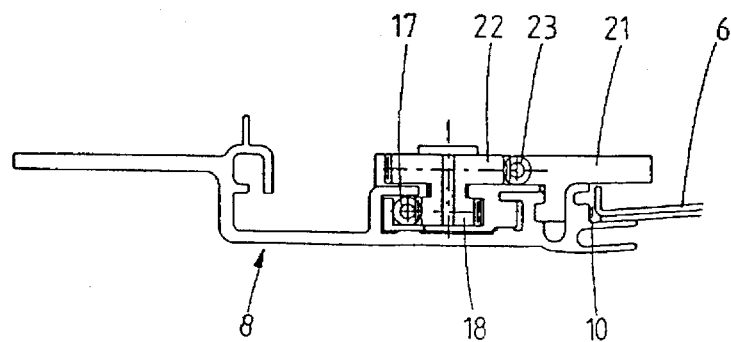

If the panel 5 is now moved back from the venting position to the closed position, as shown in FIG. 4c, then the displaceable element 12 is moved again in the direction of arrow P2 by the pull and push cable 13. At first, the free stroke or last motion connection between the limit stops 15 and 16 on the rod 14 is used up and only upon abutment against the limit stop 16 the displaceable element 12 carries the rod 14 and consequently the gear rack 17 along in the direction of arrow P2. Since the gear housing 21 is not retained by a stop in direction P2, the gear housing 21 is able to follow the displacement of the first gear rack 17 such that the pinion 18 is rotated by the gear rack 17 and the pinion 22 on the second gear rack 23 is rolling causing the gear housing 21 to move along with a speed corresponding to half the speed of the gear rack 17, whereas the second gear rack 23 remains stationary. This means that the screen 6 remains in the same position. If a forward force in the direction of arrow P1 is exerted on the screen 6, the gear rack 23 is moved forward again. As long as the free stroke between the limit stops 15 and 16 is not used up in the direction P1, the gear housing 21 and the first gear rack 17 move along with the second gear rack 23 and only after the gear rack 17 is retained, also the gear housing 21 is displaced forwardly again due to the rotation of the pinions 18, 22 relative to the gear rack 17, 23, respectively.

For displacing the panel 5 from the closed position downwardly and backwardly, the displaceable element 12 is moved by the pull and push cable 13 in direction P2 from the position according to FIG. 4c to the position of FIG. 4d during which the pinion 22 of the gear wheel 19, driven through the pinion 18 by the gear rack 17, may roll over the second gear rack 23 without moving the second gear rack 23. The gear housing 21 moves again with half the speed, of the gear rack 17. These movements are continued until the gear housing 21 abuts against the end stop 27 of the gear rack 23 causing the second gear rack 23 to move along with the gear housing 21 and at the same time the gear wheel 20 is locked causing the gear housing 21 to be carried along by the first gear rack 17 with equal speed. The whole displacement mechanism then slides as a unit together with the displaceable element 12 in the direction of arrow P2 so that also the panel 5 and the screen 6 slide as a unit backwardly to the open position. In the open position of the panel 5, the screen 6 with its upward edge 11 cannot be moved beyond the pin 24 unless of course the edge 11 or pin 23 can be made inoperative by a separate mechanism.

From the foregoing it will be clear that the invention provides a displacement mechanism for a screen of a tilt-sliding roof that operates in a reliable and simple manner and which is able to effect a relatively large displacement of the screen when the panel is tilted to the venting position due to a proper selection of the pinions for the gear racks. At all times it is possible to slide the screen manually to a (further) opened position.

The invention is not restricted to the embodiment shown in the drawing and described hereinbefore which may be varied in different manners within the scope of the invention.

I claim:

1. A tilt-sliding roof for a vehicle, said tilt-sliding roof comprising:

a panel displaceable between a first position, in which a panel closes an opening provided in the fixed roof of the vehicle, and a second position, in which the panel opens the opening provided in the fixed roof of the vehicle at least for the greater part, said panel being further tiltable between the first closed position and a third position in which the panel is tilted at least partially out of the vehicle;

a screen which is displaceable between a first closed position and an open position; and a displacement mechanism with which, in operation, the screen is opened at least a predetermined distance if the panel is moved by this displacement mechanism into the third tilted position;

said displacement mechanism including:

a displaceable element;

a first gear rack coupled to this displaceable element;

a second gear rack coupled to the screen; and a gear wheel cooperating with the first and second gear racks;

wherein the second gear rack comprises a first member protruding towards the screen and the screen comprises a second member protruding from the screen, said first and second members being adapted to engage in operation, to open the screen at least said predetermined distance when the panel is moved to the third position.

2. A tilt-sliding roof according to claim 1, wherein the gear racks and the gear wheel are commonly displaceable relative to the fixed roof when the panel is moved to the second position.

3. A tilt-sliding roof according to claim 2, wherein the gear wheel is journaled in a gear housing which is freely slidable parallel to the direction of displacement of the gear racks, a displacement of the gear housing in a direction towards the closed position of the screen being limited by a stop, whereas the relative displacement of the gear housing relative to both gear racks is limited by end stops.

4. A tilt-sliding roof according to claim 3, wherein the second gear rack is provided with said end stops.

5. A tilt-sliding roof according to claim 1, wherein the displaceable element has a last motion connection relative to the first gear rack.

6. A tilt-sliding roof according to claim 1, wherein the gear wheel includes two concentrically arranged pinions of which a second pinion is in engagement with the second gear rack.

7. A tilt-sliding roof according to claim 6, wherein the second pinion is of a diameter which is larger than that of the first pinion.

8. A vehicle comprising a tilt-sliding roof comprising:

a panel displaceable between a first position, in which a panel closes an opening provided in the fixed roof of the vehicle, and a second position, in which the panel opens the opening provided in the fixed roof of the vehicle at least for the greater part, said panel being further tiltable between the first closed position and a third position in which the panel is tilted at least partially out of the vehicle;

a screen which is displaceable between a first closed position and an open position; and a displacement mechanism with which, in operation, the screen is opened at least a predetermined distance if the panel is moved by this displacement mechanism into the third tilted position; said displacement mechanism including:

a displaceable element;

a first gear rack coupled to this displaceable element;

a second gear rack coupled to the screen; and a gear wheel cooperating with the first and second gear racks;

wherein the second gear rack comprises a first member protruding towards the screen and the screen comprises a second member protruding from the screen, said first and second members being adapted to engage in operation, to open the screen at least said predetermined distance when the panel is moved to the third position.

* * * * *